United States Patent [19]

Baker

[11] Patent Number: 5,303,475

[45] Date of Patent: Apr. 19, 1994

[54] FLEXIBLE DUCTING CUTTING TOOL

[75] Inventor: Michael E. Baker, Los Angeles, Calif.

[73] Assignee: Flexcutter, Inc., Los Angeles, Calif.

[21] Appl. No.: 935,691

[22] Filed: Aug. 21, 1992

[51] Int. Cl.[5] .................... B26B 13/00; B26B 13/04; B26B 13/06

[52] U.S. Cl. ..................... 30/254; 30/257; 30/237; 30/134

[58] Field of Search ............... 30/131, 164, 235, 237, 30/239, 252, 254, 255, 258, 330, 341, 257, 134

[56] References Cited

U.S. PATENT DOCUMENTS

| 326,314 | 9/1985 | McKay | 30/237 |
| 389,553 | 9/1888 | Diefendorf | 30/254 |
| 1,359,148 | 11/1920 | Bertrano | 30/134 |
| 3,143,799 | 8/1964 | Gover | 30/257 |
| 3,422,532 | 1/1969 | Ballard | 30/257 |
| 3,872,528 | 3/1975 | Porter | 30/134 |

Primary Examiner—Richard K. Seidel
Assistant Examiner—Paul M. Heyrana, Sr.
Attorney, Agent, or Firm—Robbins, Berliner & Carson

[57] ABSTRACT

A hand-operated cutting tool in the form of shears having handle portions and cutting portions pivoted so that the cutting portions may be rotatably moved toward and away from each other. The cutting portions each include a pair of cutting edges angularly disposed with respect to each, providing an included angle there between which is obtuse. As the cutting edges are rotated toward each other, a first portion thereof are brought into sliding, overlapping contact for shearing a flexible material such as flexible ducting and a second portion thereof are brought in sliding, overlapping contact for cutting wire.

8 Claims, 3 Drawing Sheets

FLEXIBLE DUCTING CUTTING TOOL

FIELD OF THE INVENTION

This invention relates to cutting tools, and more particularly to a hand-operated cutting tool in the form of a pair of shears, which is adapted for cutting flexible ducting, including the wire strand incorporated into such ducting. In such a tool, two sets of pivotally interconnected cutting edges are defined, the first extending forwardly for cutting the ducting material except for the wire strand, and the other disposed adjacent the pivot point for cutting the wire strand.

BACKGROUND OF THE INVENTION

In the heating and air conditioning industry, it is common to run ducting from the source of the conditioned air to registers disposed at various positions within a structure. This allows the delivery of the conditioned air to particularly desired spaces defined within the structure. Until recently, such ducting has been constructed utilizing prefabricated or on-site fabricated sheet metal, and still is in some instances. However, it has now become more common to utilize a flexible ducting which varies in diameter from 4 inches to 22 inches and traditionally is manufactured in lengths of 25 feet. This flexible ducting is constructed of inner and outer layers of a plastic material, such as mylar, with an insulating foam or similar material sandwiched therebetween. A wire constructed of spring steel in a helical form is positioned between the layers of mylar and usually is encapsulated within the inner layer of mylar to maintain the flexible ducting in the desired cylindrical form.

During installation, the installer measures the length of flexible ducting of the desired diameter which is needed in any particular run. The available flexible ducting is then cut to the desired length and installed in place between the source of the conditioned air and the register by appropriate clamps or the like. In most cases, the distance between a source of air and a register is not exactly 25 feet or a multiple thereof. Therefore, the flexible ducting must usually be cut during installation. In the prior art, such cutting has been accomplished by utilizing a double-edged knife to sever the mylar-insulating-foam sandwich and when the spring steel wire is encountered, the knife is put aside and a pair of side-cutter pliers is utilized to cut the spring steel wire. Obviously, the utilization of two separate tools to cut the flexible ducting into the desired lengths requires more time, and often results in the cut being somewhat ragged.

Applicant is aware that there exists cutting tools of many types and in many forms. Such cutting tools take the form of shears for cutting relatively soft material and side-cutter type tools designed to cut wire or cable. Applicant is unaware if any cutting tool which includes a combination of cutting edges formed on the same blade designed specifically to cut soft material on one section thereof and a hard metal wire strand on another section thereof.

SUMMARY OF THE INVENTION

A hand-operated tool for cutting flexible ducting, including a wire strand forming a part thereof and including first and second elongated members pivoted immediate the ends thereof and defining cutting portions, extending forwardly of the pivot. Each of the cutting portions defines first and second angularly disposed cutting edges disposed opposed each other. When the cutting edges are rotated toward each other, the first edges are brought into sliding, overlapping contact for cutting the flexible ducting. The second cutting edges, which are disposed adjacent said pivot are also brought into sliding, overlapping contact for cutting said wire strand.

BRIEF DESCRIPTION OF THE DRAWINGS

The above and other features of the present invention may be more fully understood from the following detailed description, taken together with the accompanying drawings, wherein similar characters refer to similar elements throughout and in which.

DETAILED DESCRIPTION

It has been traditional for a long period of time to utilize on-site or prefabricated sheet-metal ducting to transport conditioned air (cooled or heated) from a source thereof into space within a structure such as an office building or a home to be occupied by human beings. When sheet-metal ducting is utilized, it must be covered with an insulting blanket to mitigate the loss of the heat or cold which has been imparted to the air by the conditioning apparatus. It is apparent to those skilled in the art that the installation of such sheet-metal ducting is difficult and time-consuming. Special pieces for turning corners or fitting onto registers must be manufactured, sometimes on the job site, to properly complete the installation. This activity, coupled with the requirement for providing an insulating blanket or the like around the sheet-metal ducting, results in very expensive and time consuming installations.

To overcome these problems, and along with the introduction of plastic materials, flexible ducting has been introduced to the air conditioning industry. This flexible ducting is manufactured in various sizes ranging from 4 to 22 inches in diameter, and typically in 25 foot lengths. The flexible ducting can be easily bent for routing as may be required between the source of conditioned air and the register to which it is to be attached. The inner and outer surfaces of the ducting are smooth to allow easy routing and also to preclude generation of unnecessary turbulence in the air as it passes through the duct. Through the utilization of such flexible ducting, the only fitting which is required at the job site is to cut the ducting into the desired lengths and to attach the ducting to manifolds, the registers, or other pieces of ducting, as may be required. Obviously, there are additional attachments and fittings required when there is a transition from a larger to a smaller diameter ducting. The present invention is directed to a tool for cutting the flexible ducting, irrespective of its diameter, to provide the desired length of ducting to be fitted at a particular point within the air-conditioning ducting system.

Figure 1:
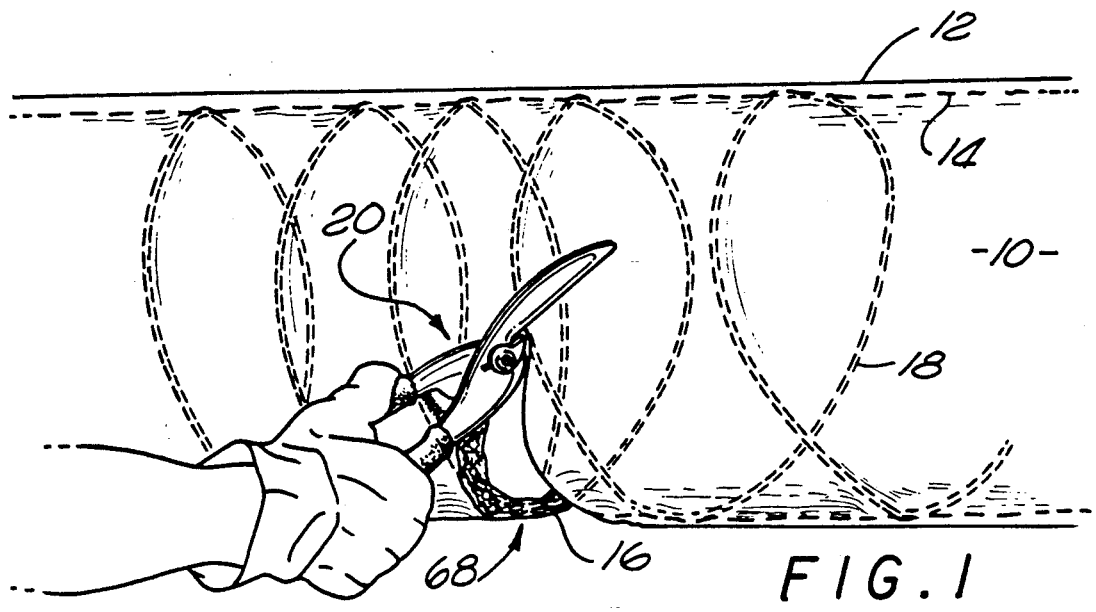
FIG. 1 is a perspective view illustrating the cutting tool of the present invention being operated to cut a flexible duct.

As is shown in FIG. 1, to which reference is hereby made, the flexible ducting 10 includes an outer layer 12 and an inner layer 14 having a layer of flexible insulating material 16, such as polyurethane foam, sandwiched therebetween. The outer and inner layers 12 and 14 of material are preferably formed from a smooth surfaced flexible plastic material such as mylar or the like. Obviously, a tubular member of insulting material such as foam sandwiched between mylar plastic layers 12 and 14 does not have the structural integrity required to retain its shape at all times. Therefore, wire strand 18 is introduced to the structure for this purpose. The wire strand 18 may be imbedded into one of the layers 12 or 14 of the plastic material as it is fabricated, or may be otherwise disposed as may be desired. The wire strand 18 is preferably formed of spring steel having a high modulus of elasticity. Such a wire provides sufficient structural support to allow the ducting 10 to be manipulated as required during installation without substantial deformation of the required tubular shape. As will be readily apparent to those skilled in the art, spring steel is quite hard and is very difficult to cut. Typically heavy-duty side-cutters or miniature bolt cutters must be used to cut such wire, depending upon its gauge.

A cutting tool 20, constructed in accordance with the principles of the present invention, is utilized to cut the flexible ducting 10 into the desired lengths for installation at a particular job. As will be more fully described hereinbelow, the hand operated cutting tool 20 is designed to provide the operator with a single tool, which can be used (a) to puncture the flexible ducting 10, (b) to cut the plastic-foam sandwich structure cleanly and evenly in a shearing scissor-like fashion, and, when the wire strand 18 is encountered, (c) to sever the wire in the same cutting operation without having to stop and change to a different tool for that purpose.

Figure 2:
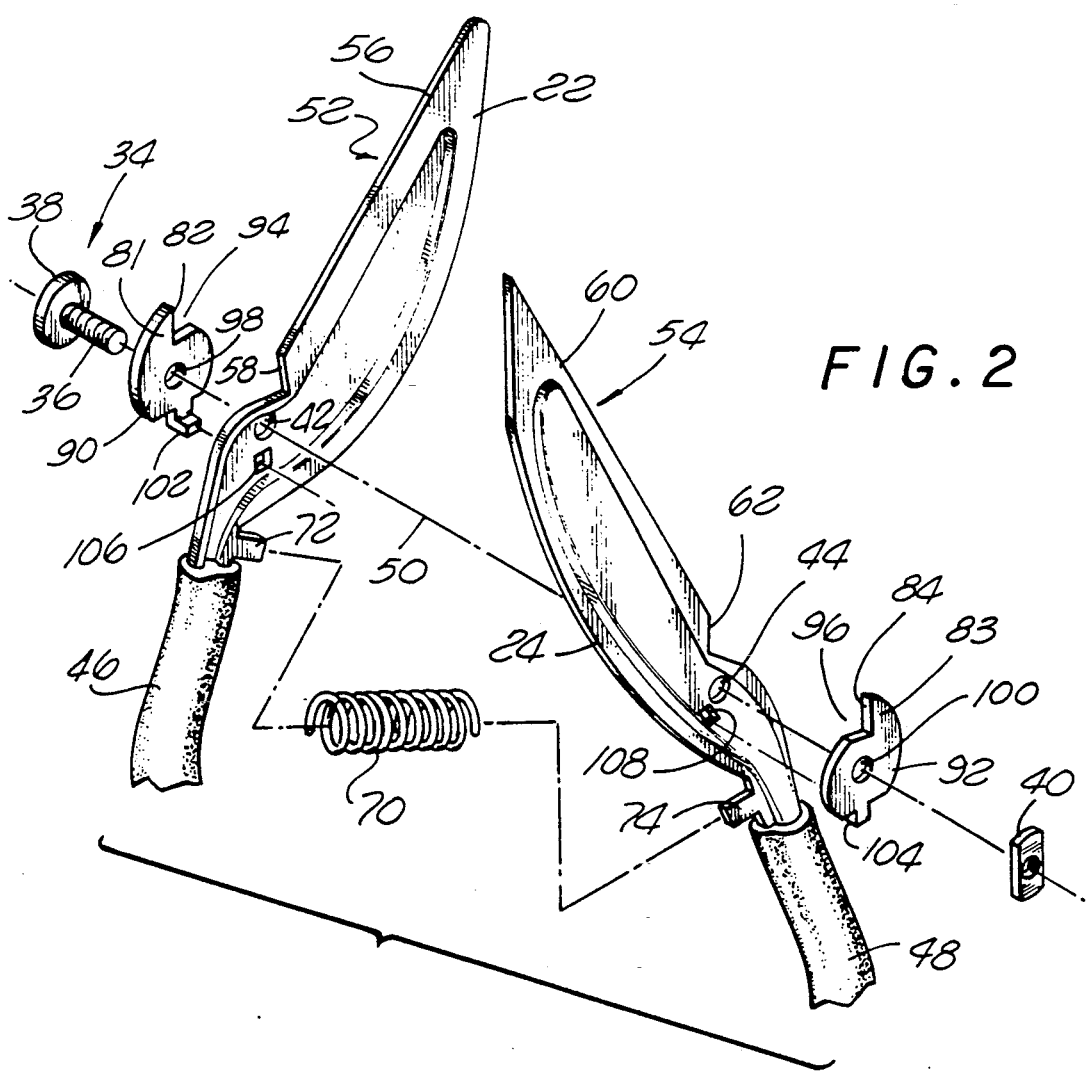
FIG. 2 is an exploded perspective view showing various components of the present invention.
Figures 3, 4:
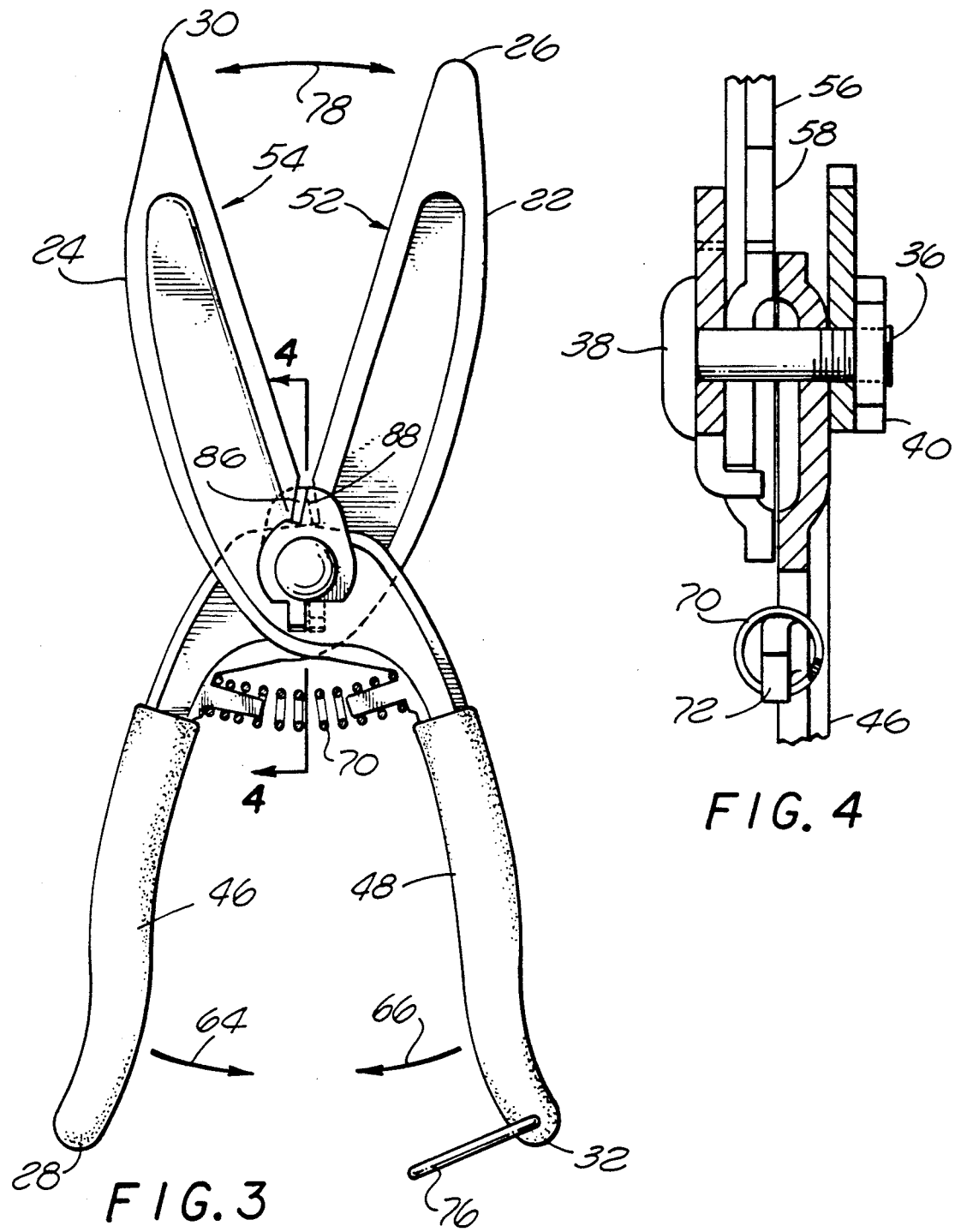
FIG. 3 is a plan view of the cutting tool of the present invention in an open position.
FIG. 4 is a partial cross-sectional view taken about the lines 4—4 of FIG. 3.
Figure 5:
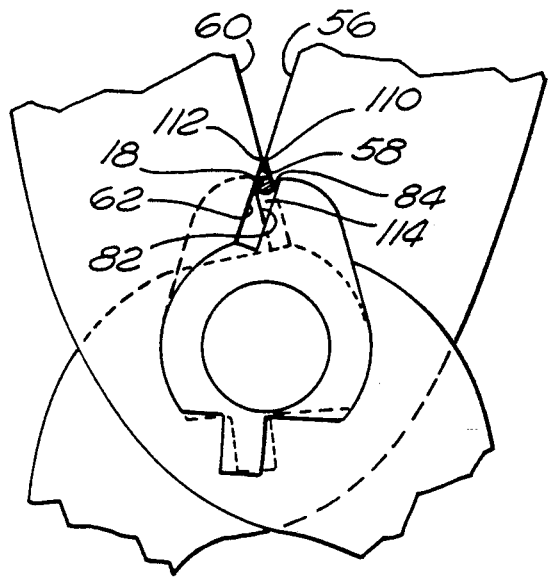
FIGS. 5, 6, 7 and 8 are segmented views illustrating the capture and cutting of a wire strand.

Referring now to FIGS. 2 through 4, the cutting tool of the present invention will be described in greater detail. As is therein shown, the cutting tool of the present invention includes first 22 and second 24 elongated members. The elongated member 22 has ends 26 and 28 thereof, while the elongated member 24 has ends 30 and 32 thereof. The elongated members 22 and 24 are interconnected intermediate their respective ends for relative rotation about a pivotal axel 34. The axel 34 may take any form desired, such as a rivet or the like. In the presently preferred embodiment, the axel 34 takes the form of a threaded shank 36, having a head 38 with a nut 40 threadably secured upon the shank 36. The shank 36 is received within openings 42 and 44 defined by the elongated members 22 and 24, respectively. The elongated members 22 and 24 include handle portions 46 and 48, respectively, extending in a first direction from the pivotal axis 50 extending through the center of the axel 34. The elongated members 22 and 24 each also define cutting portions 52 and 54, respectively, which extend in the opposite direction from the pivotal axis 50. Throughout the specification and claims, the direction in which the handle portions extend will be referred to as the rearwardly extending portion of the elongated members 22 and 24 and the direction in which the cutting portions extend will be referred to as the forwardly extending portions of the elongated members 22 and 24.

The cutting portion 52 on the elongated member 22 includes a first cutting edge 56 and a second cutting edge 58, while the cutting portion 54 on the elongated member 24 includes a first cutting edge 60 and a second cutting edge 62. The first and second cutting edges 56 and 58 are angularly disposed at a transition point 110, while the first and second cutting edges 60 and 62 are angularly disposed at a transition point 112. The first and second cutting edges on each of the cutting portions 52 and 54 define an included obtuse angle. In operation the handles 46 and 48 are directed towards each other by the operator gripping them as illustrated in FIG. 1 as shown by the arrows 64 and 66. When this occurs, the cutting portions 52 and 54 are rotated towards each other about the axis 50 (FIG. 3) so that the cutting edges are brought into sliding, overlapping contact. As the sliding, overlapping contact occurs between the first cutting edges 56 and 60, the mylar-foam sandwich portions of the ducting 10 are severed providing a smooth cut and is shown at 68 in FIG. 1. When a wire strand 18 is encountered, the cutting edges 56 and 60 are incapable of severing the same. The operator then allows the handles 46 and 48 to move away from each other. As is shown, a spring 70 is held in place upon a pair of keepers 72 and 74 to continuously urge the handles 46 and 48 away from each other when the latch 76 is disengaged from the end 28 of the handle 46. With the handles 46 and 48 apart, the cutting portions 52 and 54 will also be moved apart as indicated by the arrow 78 in FIG. 3. The operator then urges the cutting tool forward towards the wire strand 18, causing it to be received between the cutting edges 58 and 62 adjacent the pivotal axis 50. The operator then closes the handles 46 and 48 toward each other to cause the cutting edges 58 and 62 to be brought into sliding, overlapping contact and sever the wire strand 18. Simultaneously, as the wire strand is severed, the cutting edges 56 and 60 will continue to function to cut the mylar-foam sandwich material. Thus, it can be seen that the ducting 10 is cut along the desired line in a substantially continuous cutting motion with only the hesitation required to position the wire strand 18 at the rearward most portion of the cutting portions 52 and 54.

As the wire strand 18 is positioned for being severed by the cutting edges 58 and 62, the severing is facilitated by supporting surfaces 82 and 84, respectively, which are spaced from and substantially parallel to their respective cutting edges. It has been found that when cutting a wire strand, particularly one which is relatively hard as is the case with the spring steel wire strand 18, that it is more appropriate to maintain the wire strand as nearly perpendicular to the cutting edges 58 and 62 as possible. This enhances a clean cut and assures that the wire-strand will be severed with the least amount of effort. The supporting surface 82 defines a plane which extends parallel to, but spaced from, the surface defining the cutting edge 58. Such spacing defines a slot 86 through which the wire strand 18 may extend. Similarly, the supporting surface 84 defines a plane which is parallel to, but offset from, the surface defining the cutting edge 62, and also defines a slot 88 through which the wire strand 18 may pass.

The supporting surfaces 82 and 84 may be formed in any manner desired and may, for example, be formed integrally with the elongated members with which they are associated as by welding or the like. In accordance with a presently preferred embodiment of the present invention, the surfaces are formed by a washer-shaped member which has been cut away to provide the desired supporting surface. For example, the supporting surface 82 is defined by a finger 81 extending from a first washer 90, while the surface 84 is defined by a finger 83 extending from a second washer 92. The washers are cut away as shown at 94 and 96 to provide the surfaces 82 and 84. Each of the washers also defines an opening 98-100 through which the threaded shank 36 extends. Tangs 101 and 104 protrude inwardly from the washers 90 and 92, respectively, to seat in or engage openings or recesses 106 and 108, respectively, which serve to position the surfaces 82 and 84 in the desired relationship to the cutting edges 58 and 62 and to retain the washers 90 and 92 so that they are carried by, and rotate with, the elongated members 22 and 24 as they rotate about the axis 50. Although the washers 90 and 92 are generally pear-shaped and are held in place with the tangs, it should be understood by those skilled in the art that such configuration is not critical. The washers can take any geometric configuration desired so long as the supporting surfaces are provided in spaced relationship to the cutting edges and such supporting surfaces are maintained in such relationship. This may be accomplished such as by welding an extension to the elongated member, by providing serrations between the washer and the elongated member, by providing a slot and key between the two members or the like.

By referring now more particularly to FIGS. 5 through 8, the operation of the cutting tool constructed in accordance with the present invention in severing a wire strand, such as the wire strand 18 is illustrated. As is shown particularly in FIG. 5, when the transition point 110 between the cutting edges 56 and 58 is immediately adjacent the transition point 112, between the cutting edges 60 and 62, a diamond-shaped opening 114 is provided within which the wire strand 18 is captured. The diamond-shaped opening 114 is defined by the components defining the cutting edges 58 and 62 and the supporting surfaces 82 and 84.

Figure 6:
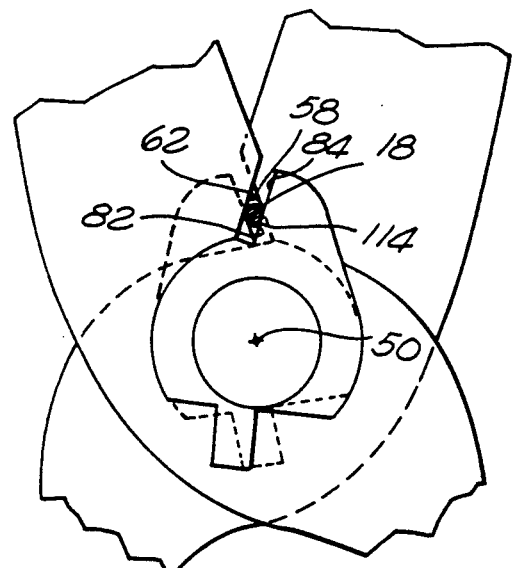
Figure 7:
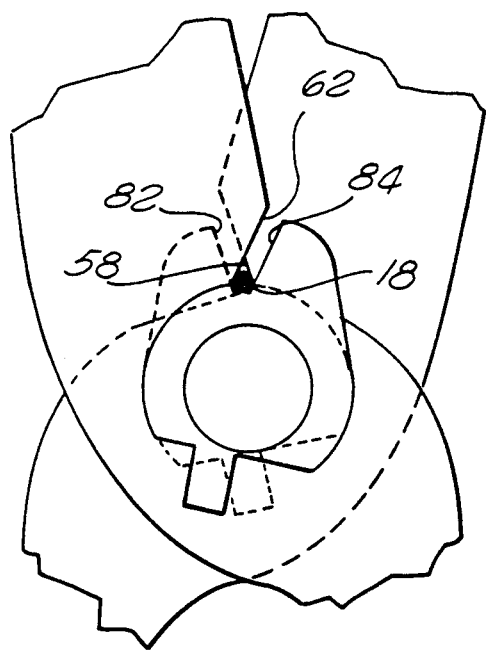
Figure 8:
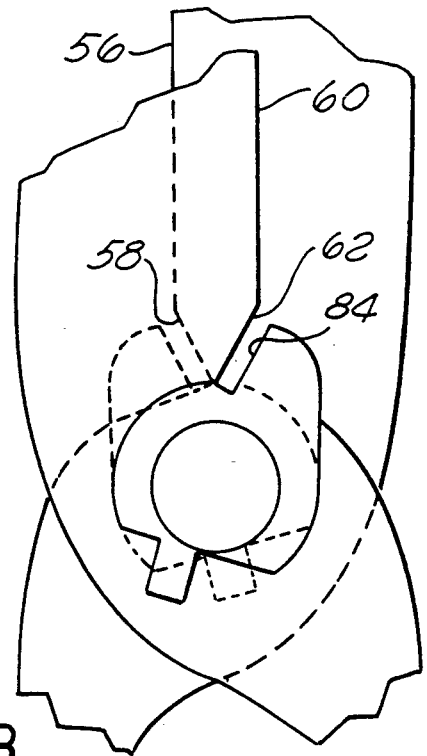

As is shown in FIG. 6, as the cutting edges are rotated more toward each other into sliding, overlapping contact, the opening 114 grows smaller and the wire strand 18 is propelled by the surfaces defining the cutting edges 58 and 62 toward the pivot axis 50. This continues, and until as is shown in FIG. 7, the wire strand is captured between the cutting edges 62 and 58 and is supported against rotation by the supporting surfaces 82 and 84. Upon completion of the closure so that the cutting edges fully overlap, as is shown in FIG. 8, the wire 18 is severed. It should also be noted that as the wire-severing operation occurred, as is illustrated in FIGS. 5 through 8, the cutting edges 56 and 60 continue to progressively, slidingly overlap with each other, thereby continuing the cutting operation of the mylar-foam sandwich portion of the flexible ducting along the desired line (FIG. 1).

There has thus been disclosed, a hand-operated cutting tool adapted for cutting flexible ducting, including wire strands contained therein without the necessity of changing tools.

What is claimed:

1. A hand-operated tool for cutting flexible ducting including a wire strand forming a part thereof, said tool comprising:

first and second elongated members each having a rearwardly extending handle portion and a forwardly extending cutting portion;

means interconnecting said members for relative rotation about a pivotal axel disposed between said handle and cutting portions;

each said cutting portion defining first and second angularly disposed cutting edges defining an obtuse included angle at a transition point therebetween, said first cutting edges disposed such that when said cutting portions are rotated toward each other said first cutting edges are brought into sliding overlapping contact for cutting said flexible ducting except for said wire strand, said second cutting edges disposed such that when said cutting portions are rotated toward each other said second cutting edges are brought into sliding overlapping contact for cutting said wire strand, said second cutting edges being disposed adjacent said pivotal axel, said transition point between said first and second cutting edges being disposed such that as said cutting portions are rotated toward each other said transition point is the first point of contact therebetween.

2. A cutting tool as defined in claim 1 which further includes means defining a support surface disposed substantially parallel to and spaced from each said second cutting edge for supporting said wire strand during cutting thereof.

3. A cutting tool as defined in claim 2 wherein said means defining said support surface is carried by said first and second members.

4. A cutting tool as defined in claim 3 wherein said means defining said support surfaces includes a finger extending along said second cutting edge.

5. A cutting tool as defined in claim 4 wherein said means defining said support surfaces includes first and second washer like members non-rotatably secured to said first and second elongated members, respectively.

6. A cutting tool as defined in claim 5 wherein each said washer-like member includes a tang received within a seat therefor on each said elongated member.

7. A cutting tool as defined in claim 1 wherein said second cutting edges on said first and second elongated members define an enclosed opening when said transition on each said cutting edges contact the other.

8. A cutting tool as defined in claim 7 wherein as said cutting portions are rotated toward each other said enclosed opening grows smaller and a wire trapped therein is moved toward said axel.

* * * * *